Patented Oct. 14, 1947

2,429,129

UNITED STATES PATENT OFFICE 2,429,129

TEMPERING OF FABRICATED GLASS ARTICLES

George Heppell, St. Lambert, and Walter Francoeur, Montreal, Quebec, Canada

No Drawing. Application July 5, 1944, Serial No. 543,604

2 Claims. (Cl. 49—45)

This invention relates to the tempering of previously fabricated glass articles by heating them to a predetermined temperature and then chilling or quenching them in a liquid bath which is heated to a lower temperature whereby the resistance of the glass article to mechanical and thermal shock is increased.

The main object of the invention is to temper glass articles with a higher degree of tempered strength than has been possible heretofore.

A further object of the invention is to decrease the cracking and checking of glass articles during the tempering process.

A still further object is to provide a method of tempering or case hardening glass articles which will produce a uniform and definite degree of temper without disrupting the surface of the glass itself.

These and other objects may be accomplished by employing our invention which embodies heating the fabricated glass articles to a predetermined temperature which is below the softening point of the glass and then chilling the glass in a liquid bath consisting of molten alkali nitrates and/or nitrites to which is added a comparatively small percentage of a molten zinc-aluminum-copper alloy containing a large amount of zinc and relatively small amounts of aluminum and copper. The temperature of the quenching bath is naturally lower than the temperature of the heating furnace. After quenching in the molten bath, the glass articles are placed in a dry furnace and are allowed to cool gradually to ordinary temperatures. It is well known to quench heated glassware articles in baths of molten inorganic salt or mixtures of salts. We have found, however, that by adding to the molten salt bath a small quantity of said molten alloy consisting of zinc, aluminum and copper, the glass articles may be tempered and strengthened to a higher degree of strength and resistance to shock and also with less cracking and checking of the glass articles during the tempering process than has heretofore been possible. The zinc-aluminum-copper alloy employed is made in accordance with the formula disclosed in U. S. Patent No. 1,596,761, dated August 17, 1926. It has a comparatively low melting point around 650° F. and comprises zinc 93%, aluminum 4%, and copper 3%.

In carrying out our invention prefabricated glass articles are heated in a dry furnace to approximately 1150 to 1200° F. which is just short of the softening point of the glass. The salt bath which we employ consists of sodium nitrate ($NaNO_3$) approximately 14%, sodium nitrite ($NaNO_2$) approximately 32%, and potassium nitrate ($KNO_3$) approximately 54%. These proportions are only approximate and may be varied within moderate limits. To the bath of molten salts we add from 5 to 10 per cent of the zinc, aluminum, copper alloy. This quenching bath is heated to a temperature of 750° F. to 950° F. depending somewhat on the thickness of the glass articles which are to be tempered. The time of quenching is relatively short depending somewhat upon the thickness of the glass but it will generally be about one minute. In tempering hollow glassware, such as bottles, and the like, it is necessary to actually immerse the articles in the molten bath. However, fabricated articles of flat or substantially flat glass may be sprayed with the molten salt and metal mixture.

While it is not known why the addition of the molten metal alloys to the molten salt bath is so effective in increasing the tempering strength, resistance to shock and the lessening of the cracking and checking of the glass articles during the tempering process, nevertheless these results are accomplished. As soon as the glass articles have been removed from the molten bath, they are then placed in a dry furnace at a temperature of around 400° F. and thereafter gradually allowed to cool down to ordinary temperatures. Naturally the glassware during all or any of these operations is maintained free from draughts.

What we claim is:

1. A glass tempering medium comprising a molten bath containing a salt selected from the group consisting of alkali nitrates and nitrites and from 5% to 10% of a low melting point alloy which melts at a temperature of approximately 650° F. and comprises zinc 93%, aluminum 4%, and copper 3%.

2. A glass tempering medium comprising a molten bath containing a salt selected from the group consisting of alkali nitrates and nitrites and from 5% to 10% of a low melting point alloy which melts at a temperature of approximately 650° F. and comprises zinc 93%, aluminum 4%, and copper 3%, said bath being heated to a temperature of from 750° F. to 950° F.

GEORGE HEPPELL.
WALTER FRANCOEUR.

REFERENCES CITED

The following references are of record in the file of this patent:

UNITED STATES PATENTS

| Number | Name | Date |
|---|---|---|
| 2,205,180 | Shaver | June 18, 1940 |
| 2,205,181 | Shaver | June 18, 1940 |

OTHER REFERENCES

The Iron Age, New York, vol. 130; Nov. 10, 1932, page 721.

"Medium Temperature Salt Baths," Eddy. (Copy in Scientific Library.)